(12) United States Patent
Pokaipisit et al.

(10) Patent No.: US 11,508,402 B1
(45) Date of Patent: Nov. 22, 2022

(54) SLIDER ASSEMBLIES HAVING RECESSES WITH SOLDER STRUCTURES FOR MAGNETIC RECORDING DEVICES, AND RELATED METHODS OF FORMING SLIDER ASSEMBLIES

(71) Applicant: Western Digital Technologies, Inc., San Jose, CA (US)

(72) Inventors: Artorn Pokaipisit, Bangkok (TH); Krisda Siangchaew, Siangchaew (TH); Sakthavorn Phongwanitchaya, Pathumthani (TH)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/476,966

(22) Filed: Sep. 16, 2021

(51) Int. Cl.
*G11B 5/48* (2006.01)
*G11B 5/21* (2006.01)

(52) U.S. Cl.
CPC .............. *G11B 5/4826* (2013.01); *G11B 5/21* (2013.01)

(58) Field of Classification Search
None
See application file for complete search history.

(56) References Cited

U.S. PATENT DOCUMENTS

| | | | | |
|---|---|---|---|---|
| 9,013,967 B1* | 4/2015 | Nakamura | ............ | G11B 5/6088 360/59 |
| 9,070,387 B1* | 6/2015 | Demtchouk | ............ | G11B 5/105 |
| 9,123,374 B1* | 9/2015 | Tohmon | ............... | G11B 5/3133 |
| 9,165,572 B2 | 10/2015 | Takei et al. | | |
| 9,171,562 B1 | 10/2015 | Puttichaem et al. | | |
| 9,202,478 B1 | 12/2015 | Demtchouk | | |
| 9,257,138 B1* | 2/2016 | Ouyang | ............... | G11B 5/4826 |

(Continued)

FOREIGN PATENT DOCUMENTS

WO WO-2013163341 A1 * 10/2013 ............... G02B 1/11

OTHER PUBLICATIONS

Nakamura, Y. et al., "Effect of oxygen plasma etching on adhesion between polyimide films and metal", Thin Solid Films, Elsevier, vol. 290-291, Dec. 1996, pp. 367-369, https://doi.org/10.1016/S0040-6090(96)09017-7.

(Continued)

*Primary Examiner* — William J Klimowicz
(74) *Attorney, Agent, or Firm* — Patterson & Sheridan, LLP; Steven H. VerSteeg (57) ABSTRACT

Aspects of the present disclosure generally relate to slider assemblies for magnetic heads of magnetic recording devices. In one aspect, a slider assembly for magnetic recording devices includes a slider and an anti-reflection coating (ARC) structure disposed on the slider. The ARC structure includes an outer surface facing away from the slider, and a recess extending into the outer surface to define a recessed surface. The slider assembly includes a soldered structure disposed on the recessed surface and at least partially in the recess of the ARC structure. In one aspect, a method of forming a slider assembly includes forming an anti-reflection coating (ARC) structure on a slider. The ARC structure includes an outer surface facing away from the slider. The method includes forming a recess in the ARC structure, and forming a solder structure on a recessed surface and at least partially in the recess of the ARC structure.

20 Claims, 8 Drawing Sheets

(56) References Cited

U.S. PATENT DOCUMENTS

| | | | |
|---|---|---|---|
| 9,558,775 B2* | 1/2017 | Jandric | G11B 5/105 |
| 10,614,841 B1* | 4/2020 | Hosoi | G11B 5/4826 |
| 10,622,783 B1* | 4/2020 | Hosoi | H01S 5/023 |
| 10,943,613 B1* | 3/2021 | Hosoi | G11B 5/3906 |
| 11,127,424 B1* | 9/2021 | Gao | G11B 13/04 |
| 2005/0112879 A1 | 5/2005 | Fujimoto et al. | |
| 2008/0083611 A1 | 4/2008 | Felmetsger | |
| 2013/0279310 A1 | 10/2013 | Zhong et al. | |
| 2014/0209664 A1* | 7/2014 | Takayama | G11B 5/105 |
| | | | 228/104 |
| 2015/0040390 A1 | 2/2015 | Shimazawa et al. | |
| 2015/0154988 A1* | 6/2015 | Takei | G11B 5/4866 |
| | | | 369/13.14 |
| 2018/0025914 A1 | 1/2018 | Zhou et al. | |
| 2021/0118469 A1* | 4/2021 | Khamnualthong | C23C 28/04 |

OTHER PUBLICATIONS

Bashilia, Harish C. et al., "Ar+H2 plasma etching for improved adhesion of PVD coatings on steel substrates", Vacuum, Elsevier, vol. 86, Issue 8, Feb. 2012, pp. 1165-1173, https://doi.org/10.1016/j.vacuum.2011.10.028.

* cited by examiner

SLIDER ASSEMBLIES HAVING RECESSES WITH SOLDER STRUCTURES FOR MAGNETIC RECORDING DEVICES, AND RELATED METHODS OF FORMING SLIDER ASSEMBLIES

BACKGROUND OF THE DISCLOSURE

Field of the Disclosure

Aspects of the present disclosure generally relate to slider assemblies for magnetic recording devices, such as magnetic read heads of hard disk drives (HDD).

Description of the Related Art

The heart of the functioning and capability of a computer is the storing and writing of data to a data storage device, such as a hard disk drive (HDD). The writing and reading of data to and from a data storage device is conducted using a write and read head on a slider.

The volume of data processed by a computer is increasing rapidly. There is a need for higher recording density of a magnetic recording medium (such as recording densities exceeding 2 Tbit/in$^2$ for a magnetic recording medium) to increase the function and the capability of a computer.

The bonding of the write and read head to the slider can be weak and can erode over time and/or after operations. At least a part of the write and read head can debond from the slider (such as during writing or reading operations), which can cause failure rates that are 50% for magnetic recording devices.

The failures hinder soldering yield and result in cost increases for replacement of parts of the write and read heads. These problems can be exacerbated by increases in volumes of data processed.

Therefore, there is a need in the art for an improved write and read head that facilitates reduced failure rates.

SUMMARY OF THE DISCLOSURE

Aspects of the present disclosure generally relate to slider assemblies for magnetic heads of magnetic recording devices. In one aspect, a slider assembly for magnetic recording devices includes a slider and an anti-reflection coating (ARC) structure disposed on the slider. The ARC structure includes an outer surface facing away from the slider, and a recess extending into the outer surface to define a recessed surface. The slider assembly includes a soldered structure disposed on the recessed surface and at least partially in the recess of the ARC structure. In one aspect, a method of forming a slider assembly includes forming an anti-reflection coating (ARC) structure on a slider. The ARC structure includes an outer surface facing away from the slider. The method includes forming a recess in the ARC structure, and forming a solder structure on a recessed surface and at least partially in the recess of the ARC structure.

In one embodiment, a slider assembly for magnetic recording devices includes a slider and an anti-reflection coating (ARC) structure disposed on the slider. The ARC structure includes an outer surface facing away from the slider, and a recess extending into the outer surface to define a recessed surface. The slider assembly includes a soldered structure disposed on the recessed surface and at least partially in the recess of the ARC structure.

In one embodiment, a slider assembly for data storage devices includes a sliding means and an anti-reflection coating (ARC) structure disposed on the sliding means. The ARC structure includes a first layer disposed on the sliding means and formed of a tantalum oxide, and a second layer disposed on the first layer and formed of a silicon oxide. The ARC structure includes a third layer disposed on the second layer and formed of a tantalum oxide, and a fourth layer disposed on the third layer and formed of a silicon oxide. The fourth layer includes an outer surface facing away from the slider, and a recess extending into the outer surface of the fourth layer to define a recessed surface. The slider assembly includes a soldered structure disposed on the recessed surface and at least partially in the recess of the ARC structure.

In one embodiment, a method of forming a slider assembly includes forming an anti-reflection coating (ARC) structure on a slider. The ARC structure includes an outer surface facing away from the slider. The method includes forming a recess in the ARC structure. The recess extends into the outer surface of the ARC structure to define a recessed surface. The method includes forming a solder structure on the recessed surface and at least partially in the recess of the ARC structure.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure generally relate to slider assemblies for magnetic heads of magnetic recording devices. In one aspect, a slider assembly for magnetic recording devices includes a slider and an anti-reflection coating (ARC) structure disposed on the slider. The ARC structure includes an outer surface facing away from the slider, and a recess extending into the outer surface to define a recessed surface. The slider assembly includes a soldered structure disposed on the recessed surface and at least partially in the recess of the ARC structure. In one aspect, a method of forming a slider assembly includes forming an anti-reflection coating (ARC) structure on a slider. The ARC structure includes an outer surface facing away from the slider. The method includes forming a recess in the ARC structure, and forming a solder structure on a recessed surface and at least partially in the recess of the ARC structure.

Figure 1:
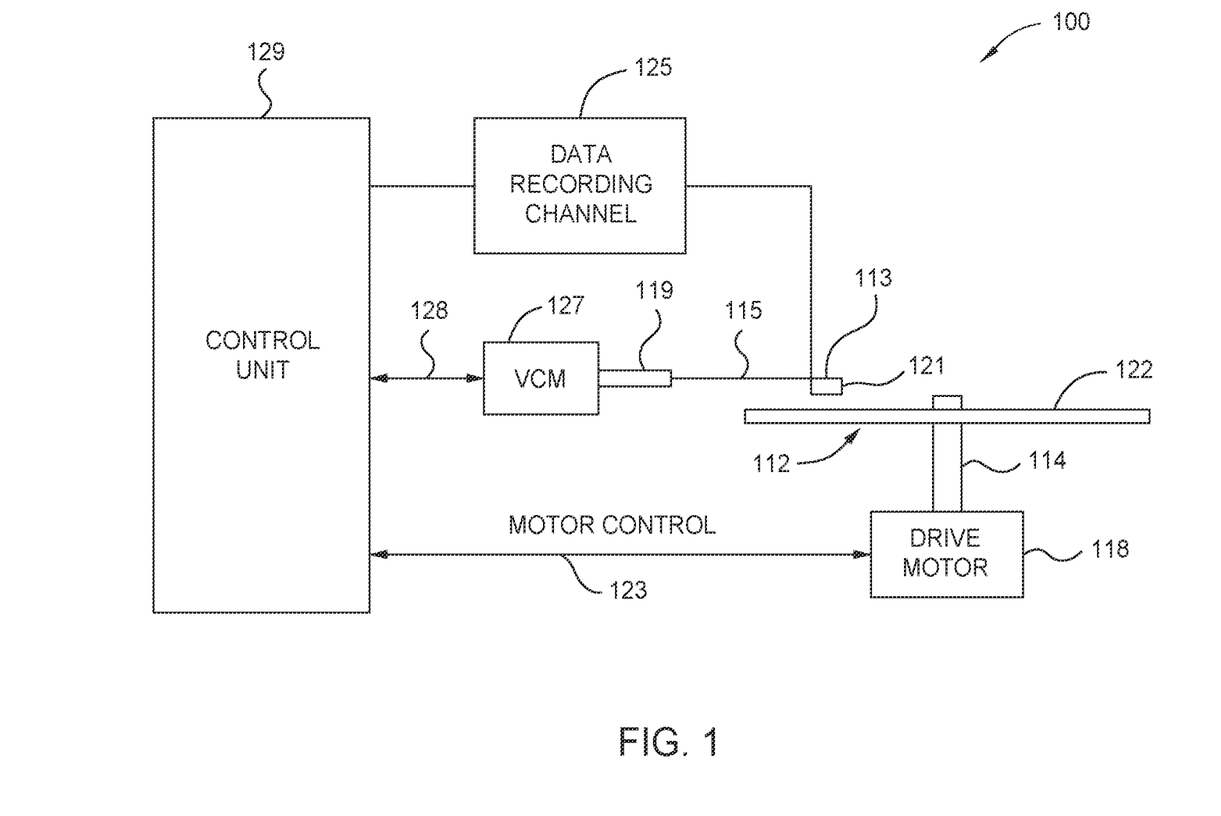
FIG. 1 is a schematic view of a magnetic media drive having a magnetic write head and a magnetic read head, according to one implementation.

FIG. 1 is a schematic view of a magnetic media drive 100 having a magnetic write head and a magnetic read head, according to one implementation. The magnetic media drive 100 may be a single drive/device or may include multiple drives/devices. The magnetic media drive 100 includes a magnetic recording medium, such as one or more rotatable magnetic disk 112 supported on a spindle 114 and rotated by a drive motor 118. For the ease of illustration, a single disk drive is shown according to one implementation. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112. Each slider 113 supports a head assembly 121 including one or more read/write heads, such as a write head and a read head having a two-dimensional magnetic recording (TDMR) device. As the magnetic disk 112 rotates, the slider 113 moves radially in and out over the disk surface 122 so that the head assembly 121 may access different tracks of the magnetic disk 112 where desired data are written or read. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field. The direction and speed of the coil movements are controlled by the motor current signals supplied by a control unit 129.

During operation of the magnetic media drive 100, the rotation of the magnetic disk 112 generates an air or gas bearing between the slider 113 and the disk surface 122 which exerts an upward force or lift on the slider 113. The air or gas bearing thus counter-balances the slight spring force of suspension 115 and supports slider 113 off and slightly above the disk surface 122 by a small, substantially constant spacing during normal operation.

The various components of the magnetic media drive 100 are controlled in operation by control signals generated by the control unit 129, such as access control signals and internal clock signals. The control unit 129 includes logic control circuits, storage means, and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on the magnetic disk 112. Write and read signals are communicated to and from the head assembly 121 by way of recording channel 125. The magnetic media drive 100 of FIG. 1 may include a plurality of media (or disks), a plurality of actuators, and/or a plurality of sliders.

Figure 2:
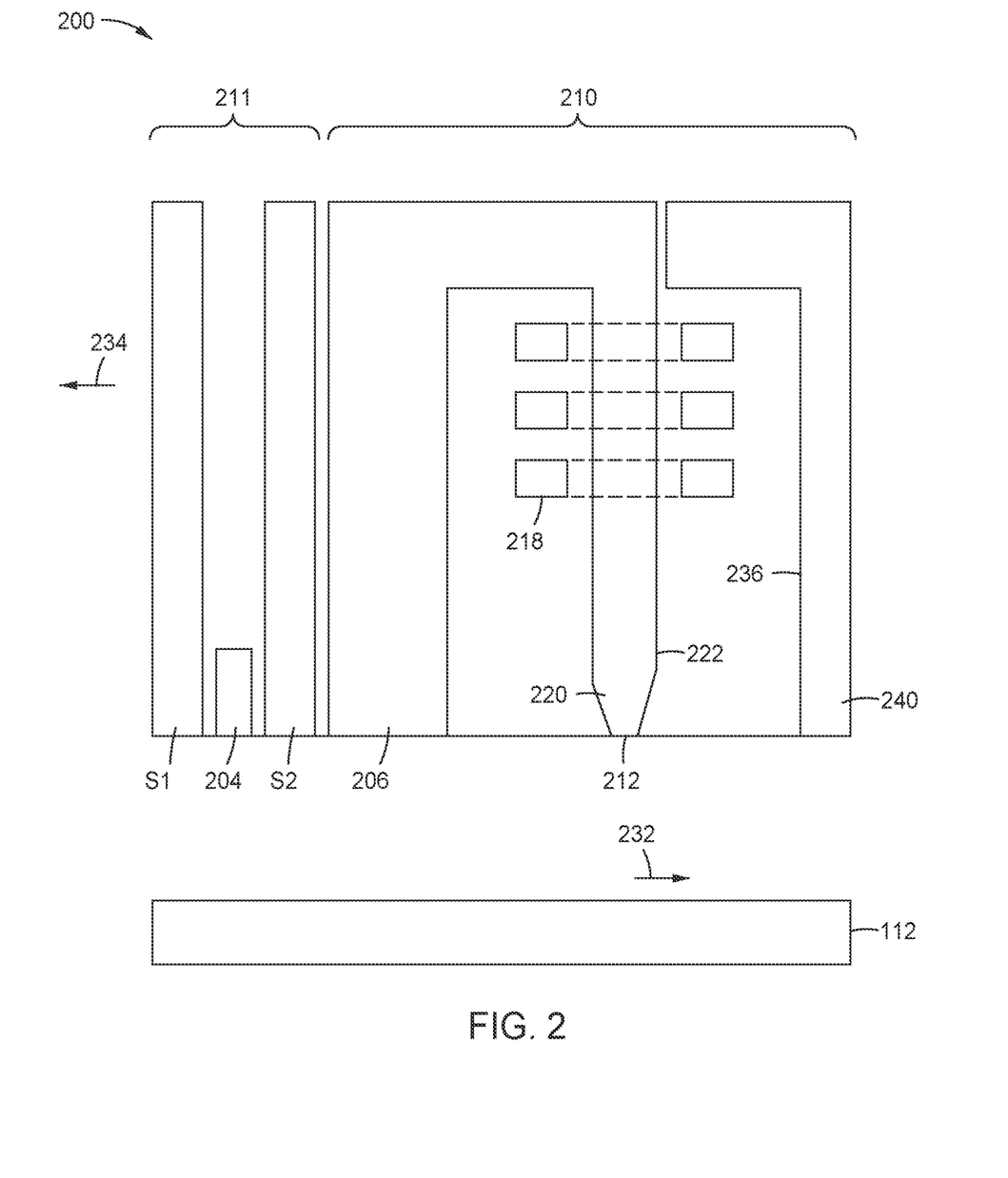
FIG. 2 is a schematic cross sectional side view of a head assembly facing the magnetic disk or other magnetic storage medium, according to one implementation.

FIG. 2 is a fragmented and schematic cross-sectional side view through a center of a read/write head 200 facing the magnetic disk 112 or other magnetic storage medium, according to one implementation. The read/write head 200 may correspond to, or be used as, the magnetic head assembly 121 described in FIG. 1. The read/write head 200 includes a media facing surface (MFS) 212, such as an air bearing surface (ABS), a magnetic write head 210, and a magnetic read head 211, and is mounted such that the MFS 212 is facing the magnetic disk 112. The MFS 212 faces the magnetic disk 112. The read/write head 200 may be an energy-assisted magnetic recording (EAMR) head. In FIG. 2, the magnetic disk 112 moves past the write head 210 in the direction indicated by the arrow 232 such that the read/write head 200 moves relative to the magnetic disk 112 in the direction indicated by the arrow 234.

In one embodiment, which can be combined with other embodiments, the magnetic read head 211 is a magnetoresistive (MR) read head that includes an MR sensing element 204 located between MR shields S1 and S2. The sensing element 204 and the shields S1 and S2 have surfaces at the MFS 212 facing the magnetic disk 112. In one embodiment, which can be combined with other embodiments, the magnetic read head 211 is a magnetic tunnel junction (MTJ) read head that includes an MTJ sensing element 204 located between MR shields S1 and S2. The magnetic fields of the adjacent magnetized regions in the magnetic disk 112 are detectable by the MR (or MTJ) sensing element 204 as the recorded bits. The sensing element 204 senses the magnetic fields of the recorded bits (such as perpendicularly recorded bits or longitudinally recorded bits) in the magnetic disk 112 by an MR effect. In one embodiment, which can be combined with other embodiments, the spacing between shields S1 and S2 is about 17 nm or less.

The write head 210 includes a return pole 206, a main pole 220, a trailing shield 240, and a coil 218 around the main pole 220 that excites the main pole 220. The coil 218 may have a helical structure or a "pancake" structure which winds around a back-contact between the main pole 220 and the return pole 206, instead of a "helical" structure shown in FIG. 2. A trailing gap and a leading gap may be in contact with the main pole, and a leading shield may be in contact with the leading gap. The leading shield may provide electromagnetic shielding and can be separated from the main pole 220 by the leading gap. A recording magnetic field (e.g., a write field) is generated from the main pole 220 using the coil 218, and the trailing shield 240 facilitates making the magnetic field gradient of the main pole 220 steep. The recording magnetic field affects a magnetic recording medium of the magnetic disk 112. The main pole 220 may be formed of a magnetic material such as an FeCo alloy. The main pole 220 can serve as a main electrode. The main pole 220 may include a trailing surface 222 which may be parallel to a leading surface 236 of the trailing shield 240. The main pole 220 may be a tapered write pole (TWP) with a trailing edge taper (TET) configuration. In one embodiment, which can be combined with other embodiments, the main pole 220 has a saturated magnetization (Ms) of 2.4 T and a thickness of about 300 nanometers (nm). The trailing shield 240 may be formed of a magnetic material such as an NiFe alloy. In one embodiment, which can be combined with other embodiments, the trailing shield 240 has an Ms of about 1.6 T.

Figure 3:
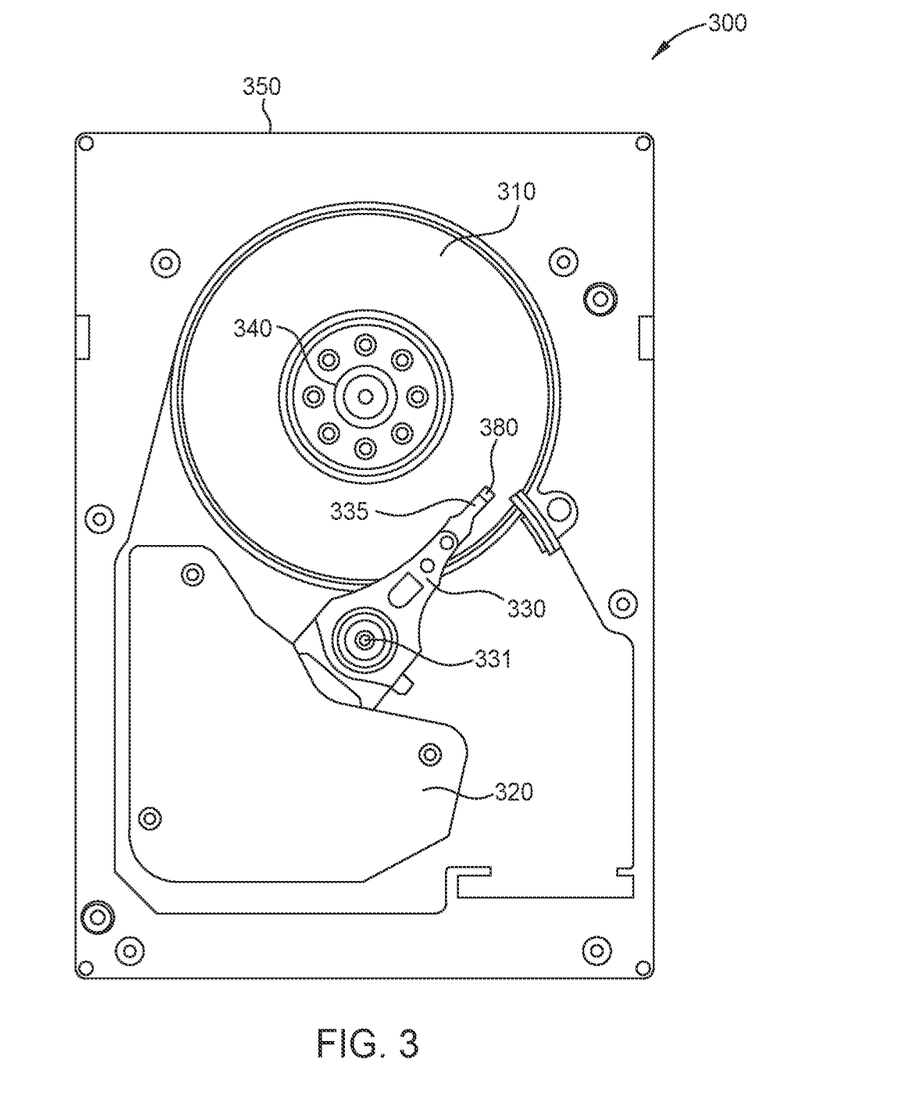
FIG. 3 is a schematic top view of a data storage device, according to one implementation.

FIG. 3 is a schematic top view of a data storage device 300, according to one implementation. The data storage device 300 can be an HDD. The data storage device 300 can be used as the magnetic media drive 100 shown in FIG. 1. As shown in FIG. 3, the data storage device 300 includes one or more magnetic media or disks 310, an actuator 320, actuator arms 330 associated with each of the magnetic disks 310, and a spindle motor 340 affixed in a chassis 350. The one or more magnetic disks 310 may be arranged vertically as shown in FIG. 3. The one or more magnetic disks 310 may be coupled with the spindle motor 340.

Each of the one or more magnetic disks 310 may include circular tracks of data on both the top and bottom surfaces of the respective disk. A magnetic head 380 mounted on a slider 335 may be positioned on a track. As each disk spins, data may be written on and/or read from the data tracks. The magnetic head 380 may be coupled to an actuator arm 330 as shown in FIG. 3. The actuator arm 330 may be configured to swivel around an actuator axis 331 to place the magnetic head 380 on a particular data track of the respective magnetic disk 310.

FIGS. 4A-4I show a schematic process flow of a method of forming a slider assembly, according to one implementation.

Figures 4A, 4B, 4C, 4D, 4E, 4F:
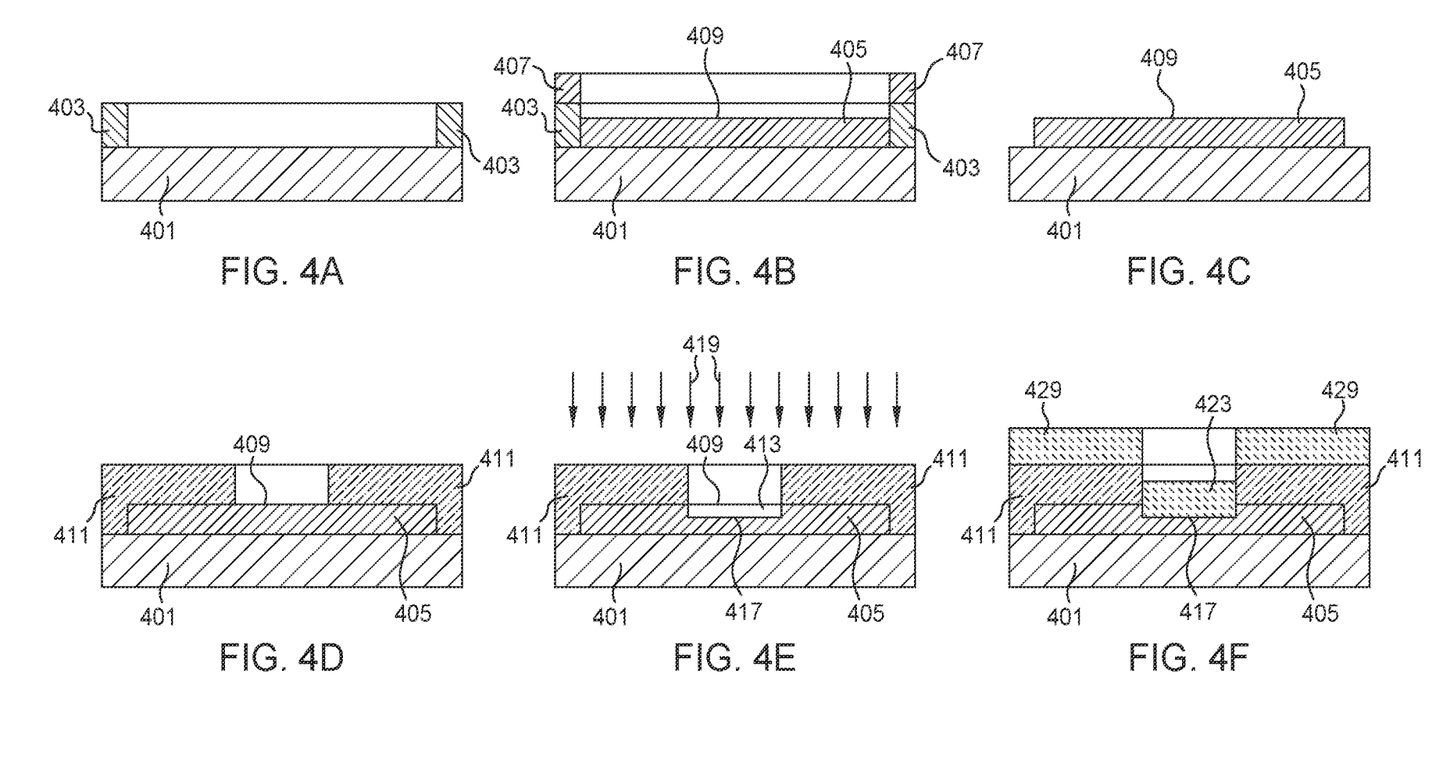
FIGS. 4A-4I show a schematic process flow of a method of forming a slider assembly, according to one implementation.

In FIG. 4A, one or more first photoresist structures 403 are formed on a slider 401 in a first patterning operation. The one or more first photoresist structures 403 are formed on two end sides of the slider 401, as shown in FIG. 4A.

Figure 4G:
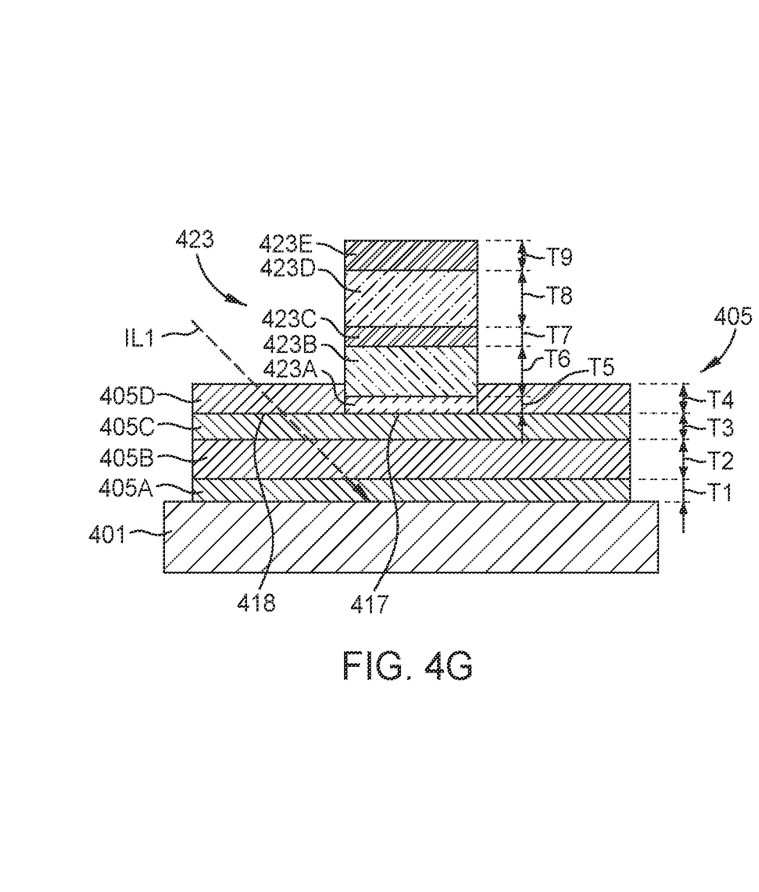

In FIG. 4B, an anti-reflection coating (ARC) structure 405 is formed on the slider 401 in a first deposition operation. ARC material 407 is also formed on the one or more first photoresist structures 403. The ARC structure 405 includes an outer surface 409 facing away from the slider 401. For purposes of clarity in FIG. 4B, the overall structure of the ARC structure 405 is shown in FIG. 4B as a single layer. The ARC structure 405 is a multilayer structure, as shown in FIG. 4G and as described below.

In FIG. 4C, the one or more first photoresist structures 403 and the ARC material 407 thereon are removed from the slider 401 in a first lift off operation.

In FIG. 4D, one or more second photoresist structures 411 are formed on and outwardly of the ARC structure 405 in a second patterning operation.

In FIG. 4E, a recess 413 is formed in the ARC structure 405 in an etching operation. The recess 413 extends into the outer surface 409 of the ARC structure 405 to define a recessed surface 417 of the ARC structure 405. Material of the ARC structure 405 is etched away using the etching operation to form the recess 413. The etching operation is a dry etching operation. The etching operation is an ion beam etching operation, and includes directing argon (Ar) ions 419 toward the ARC structure 405. The etching selectively etches the ARC structure 405 relative to the one or more second photoresist structures 411.

In FIG. 4F, a solder structure 423 is formed on the recessed surface 417 and at least partially in the recess 413 of the ARC structure 405 in one or more deposition operations. Solder material 429 is formed on the one or more second photoresist structures 411 in the one or more deposition operations. For purposes of clarity in FIG. 4F, the overall structure of the solder structure 423 is shown in FIG. 4F as a single layer. The solder structure 423 is a multilayer structure, as shown in FIG. 4G and as described below.

In FIG. 4G, the one or more second photoresist structures 411 and the solder material 429 disposed on the one or more second photoresist structures 411 are removed in a lift off operation. In FIG. 4G, the multilayer structure (including layers 405A-405D) of the ARC structure 405 is shown, and the multilayer structure (423A-423E) of the solder structure 423 is shown.

As shown in FIG. 4G, the ARC structure 405 includes a first layer 405A disposed on the slider 401 and formed of a tantalum oxide ($Ta_xO_x$), a second layer 405B disposed on the first layer 405A and formed of a silicon oxide ($Si_xO_x$). The ARC structure 405 includes a third layer 405C disposed on the second layer 405B and formed of a tantalum oxide ($Ta_xO_x$), and a fourth layer 405D disposed on the third layer 405C and formed of a silicon oxide ($Si_xO_x$). The oxide compounds can have any number of molecules "x." The third layer 405C having tantalum (Ta) acts as an etch stop for the etching operation that is used to form the recess 413.

The first layer 405A of the ARC structure 405 is of a first thickness T1 that is 5 nm or less, such as 2 nm. The second layer 405B of the ARC structure 405 is of a second thickness T2 that is within a range of 250 nm to 300 nm, such as 275 nm. The third layer 405C of the ARC structure 405 is of a third thickness T3 that within a range of 50 nm to 100 nm, such as 90 nm. The fourth layer 405D of the ARC structure 405 is of a fourth thickness T4 that is within a range of 125 nm to 175 nm, such as 150 nm.

The materials and thicknesses T1-T4 of the layers 405A-405D facilitate reducing or eliminating reflected light of an incident light IL1 (shown schematically in FIG. 4G for illustrative purposes) that is incident on the ARC structure 405 (such as during reading or writing operations) such that substantially all of the incident light IL1 transmits through the layers 405A-405D. A total reflection of the incident light IL1 from the upper surfaces (such as an upper surface 418 of the third layer 405C) of all of the layers 405A-405D is about 0% (such as less than 0.5%) of the incident light IL1. As an example, which can be combined with other examples, using different materials of $Ta_xO_x$ (having a higher refractive index than $Si_xO_x$) and $Si_xO_x$ (having a lower refractive index than $Ta_xO_x$) facilitates reducing or eliminating the light reflected from the upper surfaces of the layers 405A-405D. The different refractive indices facilitate reflected light that is out-of-phase for destructive interference so the reflected light is destroyed and considered to be eliminated. As an example, which can be combined with other examples, the different thicknesses T1-T4 used facilitate reduced or eliminated light reflection for the incident light IL1 having a wavelength within a range of 800 nm to 860 nm (such as the incident light IL1 being emitted by a laser diode).

In the implementation shown in FIG. 4G, the recess 413 extends through the fourth layer 405D of the ARC structure 405 such that the recessed surface 417 is a part of the third layer 405C of the ARC structure 405. The recessed surface 417 is a part of the upper surface 418 of the third layer 405C. The present disclosure contemplates that the recess 413 can extend past the fourth layer 405D (e.g., at least partially into the third layer 405C). The present disclosure contemplates that the recess 413 can extend partially into the fourth layer 405D such that the recessed surface 417 is a part of the fourth layer 405D.

The solder structure 423 includes a first layer 423A disposed on the recessed surface 417. The first layer 423A is formed of titanium (Ti), and has a crystalline structure that is face centered cubic (FCC). The solder structure 423 includes a second layer 423B disposed on the first layer 423A of the solder structure 423, and the second layer 423B is formed of platinum (Pt). The second layer 423B is a barrier layer. The solder structure 423 includes a third layer 423C disposed on the second layer 423B of the solder structure 423, and the third layer 423C is formed of gold (Au). The solder structure 423 includes a fourth layer 423D disposed on the third layer 423C of the solder structure 423, and the fourth layer 423D is formed of tin (Sn). The solder structure 423 includes a fifth layer 423E disposed on the fourth layer 423D of the solder structure 423, and the fifth layer 423E is formed of gold (Au).

Figure 4H:
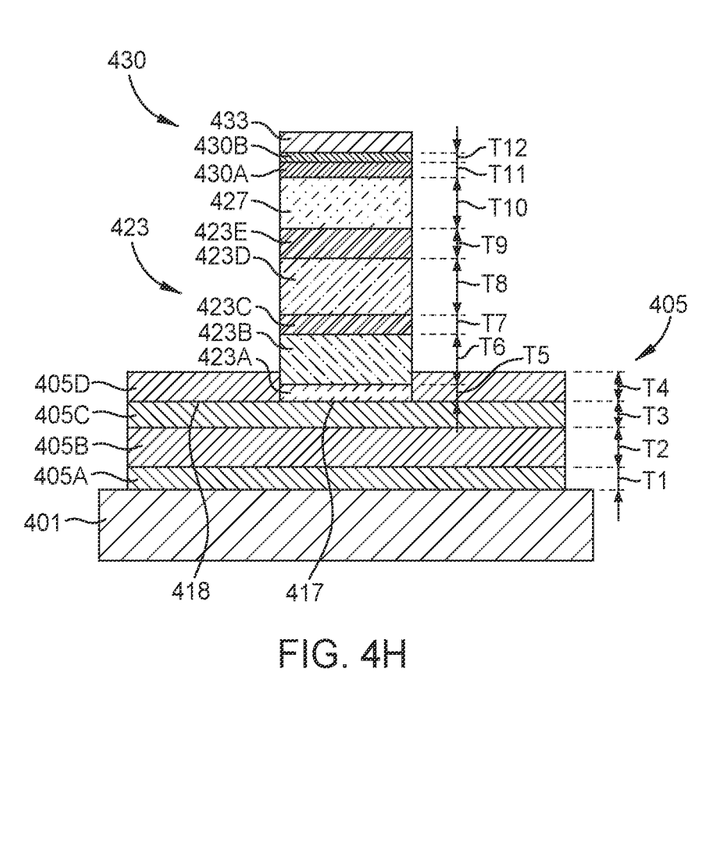

The first layer 423A is of a fifth thickness T5 that is within a range of 25 nm to 75 nm, such as 50 nm. The second layer 423B is of a sixth thickness T6 that is within a range of 175 nm to 225 nm, such as 200 nm. The third layer 423C is of a seventh thickness T7 that is within a range of 125 nm to 175 nm, such as 150 nm. The fourth layer 423D is of an eighth thickness T8 that is within a range of 950 nm to 1,050 nm, such as 1,000 nm. The fifth layer 423E is of a ninth thickness T9 that is within a range of 125 nm to 175 nm, such as 150 nm. In FIG. 4H, a gold (Au) layer 427 and a chip assembly 430 are formed in one or more deposition operations. The gold (Au) layer 427 is formed on the fifth layer 423E of the solder structure 423, and the chip assembly 430 is formed on the gold (Au) layer 427. The chip assembly 430 includes a first layer 430A disposed on the gold (Au) layer 427, and the first layer 430A of the chip assembly 430 is formed of platinum (Pt). The chip assembly 430 includes a second layer 430B disposed on the first layer 430A of the chip assembly 430. The second layer 430B of the chip assembly 430 is formed of titanium (Ti). The chip assembly 430 includes a submount 433 disposed on the second layer 430B of the chip assembly 430. The submount 433 is formed of silicon (Si). The gold (Au) layer 427 is of a tenth thickness T10 within a range of 750 nm to 850 nm, such as 800 nm. The first layer 430A is of an eleventh thickness T11 within a range of 175 nm to 225 nm, such as 200 nm. The second layer 430B is of a twelfth thickness T12 within a range of 75 nm to 125 nm, such as 100 nm.

Figure 4I:
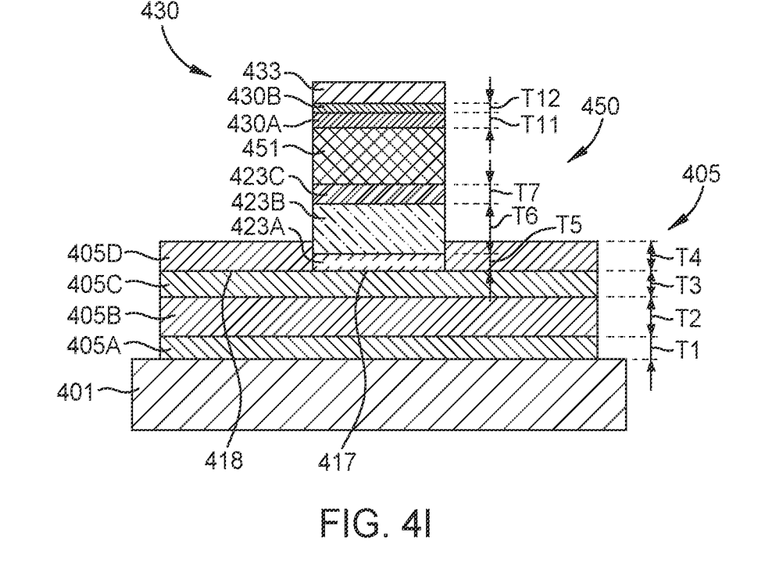

In FIG. 4I, the chip assembly 430 is soldered to the solder structure 423 in a soldering operation. The soldering of the soldering operation includes melting together the fourth layer 423D (shown in FIG. 2H) of the solder structure 423, the fifth layer 423E (shown in FIG. 2H) of the solder structure 423, and the gold (Au) layer 427 (shown in FIG. 2H) to form a soldered structure 450. The soldered structure 450 includes one or more soldered layers 451 formed of one or more gold tin (AuSn) intermetallic compounds.

The soldering of the soldering operation solders the solder structure 423 (shown in FIG. 2H) into the soldered structure 450 such that the soldered structure 450 includes the first layer 423A, the second layer 423B, and the third layer 423C.

The materials and thicknesses T5-T10 of the layers 423A-423E, 427 facilitate melting at a beneficial melting temperature during soldering to form the soldered structure 450, and facilitate a high shear strength for the soldered structure 450. As an example, the Ti used for the first layer 423A, the Pt used for the second layer 423B, the Au used for the third layer 423C, and the Sn and Au used for the fourth and fifth layers 423D, 423E and the gold layer 427 facilitate a high shear strength and melting at a beneficial melting temperature.

Figure 5A:
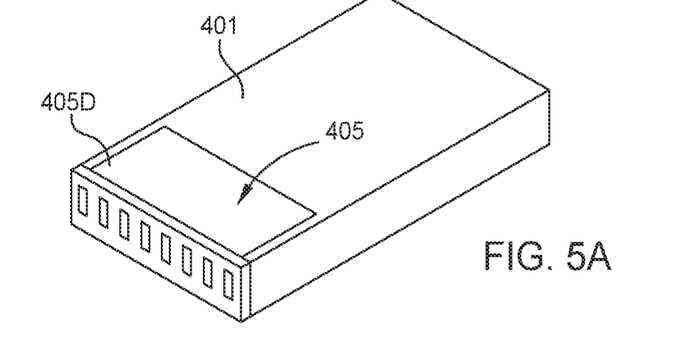
FIGS. 5A-5C show a schematic isometric partial view of the process flow of the method of forming a slider assembly shown in FIGS. 4A-4I, according to one implementation.
Figure 5B:
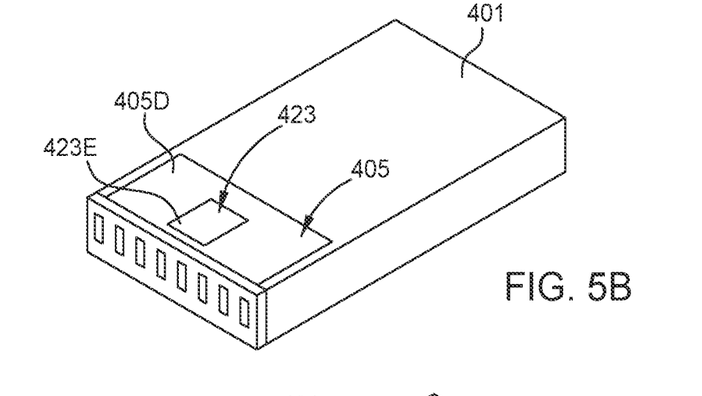
Figure 5C:
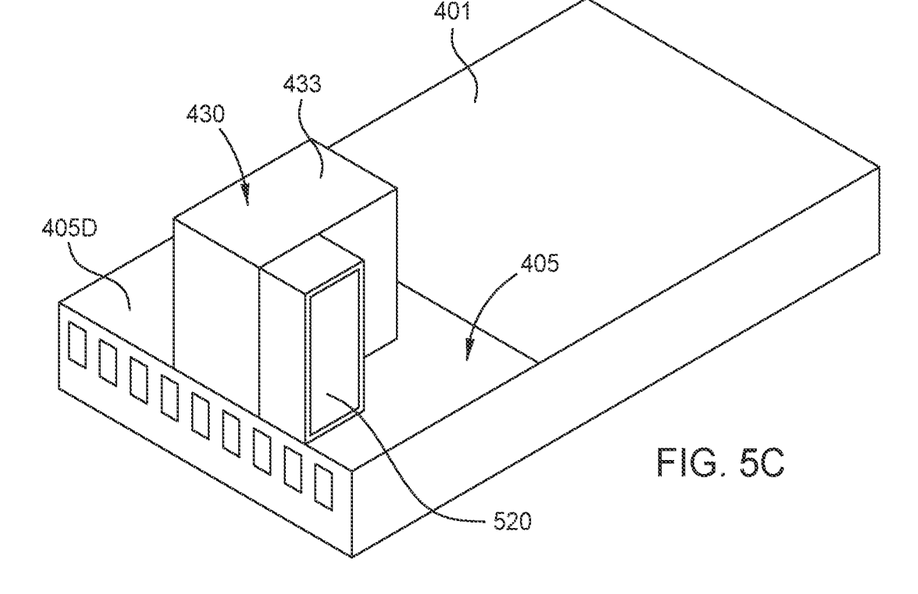

FIGS. 5A-5C show a schematic isometric partial view of the process flow of the method of forming a slider assembly shown in FIGS. 4A-4I, according to one implementation.

In FIG. 5A, the ARC structure 405 has been formed on the slider 401. FIG. 5A corresponds to FIG. 4C.

In FIG. 5B, the recess 417 has been formed in the ARC structure 405, and the solder structure 423 is formed at least partially in the recess 413. FIG. 5B corresponds to FIG. 4G.

In FIG. 5C, the soldered structure 450 and the chip assembly 430 have been formed. The method includes forming a laser diode 520 on the chip assembly 430, such as a side of the chip assembly 430. The laser diode 520 and the chip assembly 430 are part of a chip-on-submount assembly (COSA). The COSA is mounted to the slider 401 to form an integrated slider assembly. The ARC structure 405 is an insulation structure. The integrated slider assembly is mounted to a suspension to form a head-gimbal assembly.

The slider 401, the ARC structure 405, the soldered structure 450, the chip assembly 430, and the laser diode 520 are part of a slider assembly that can be used as part of a magnetic recording device (such as the magnetic media drive 100 and/or the data storage device 300). In one embodiment, which can be combined with other embodiments, the slider assembly is an integrated slider assembly of a write and read head. The slider assembly can be used for magnetic recording, such as heat assisted magnetic recording (HAMR) or microwave assisted magnetic recording (MAMR).

Figure 6:
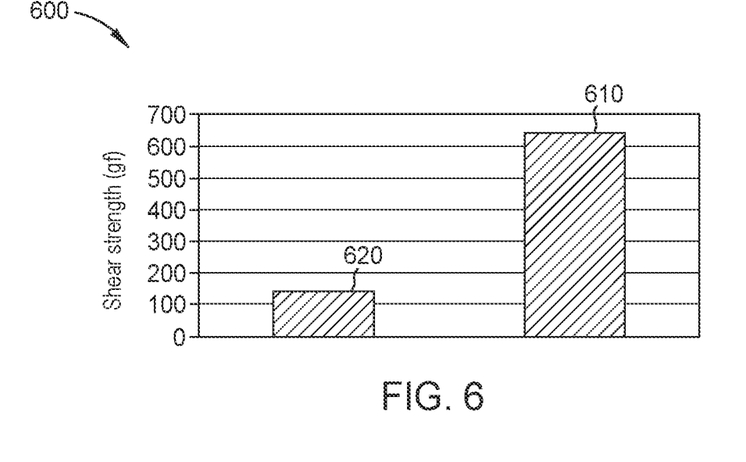
FIG. 6 is a schematic graphical view of a histogram showing shear strength of an interface between a soldered structure and an ARC structure, according to one implementation.

FIG. 6 is a schematic graphical view of a histogram 600 showing shear strength of an interface between a soldered structure and an ARC structure, according to one implementation.

A first column 610 of the histogram 600 shows a tested shear strength of an interface between a soldered structure and an ARC structure to which the soldered structure is attached. The ARC structure and the soldered structure are formed using aspects described herein, such as the method described in relation to FIGS. 4A-4I and FIGS. 5A-5C. As an example, the ARC structure includes the recess 413, and the soldered structure is attached to the recessed surface 417 of the ARC structure for the first column 610.

A second column 620 of the histogram 600 shows a tested shear strength of an interface between a soldered structure and an ARC structure that is formed according to other operations.

The first column 610 shows a tested shear strength (in gf) of the attachment of the soldered structure to the ARC structure that is more than 4.5 times stronger than the shear strength of the attachment of the second column 620. The shear strength of the first column 610 is greater than 300 gf and is greater than 640 gf, and the tested shear strength of the second column 620 is less than 145 gf. The higher shear strength that is facilitated using aspects described herein facilitates reduced likelihood of de-attachment of soldered structures (and chip assemblies) from ARC structures, reduced failures of slider assemblies, and increased durability of write and read heads. The higher shear strength also facilitates increased soldering yield in forming slider assemblies for write and read heads, and reduced replacement costs (such as replacement costs for laser diodes).

The higher shear strength (as illustrated by the first column 610) facilitates reducing a need for an adhesion layer by attaching (e.g., bonding) the soldered structure and the chip assembly to the ARC structure without an adhesion layer between the soldered structure (e.g., the first layer 423A) and the ARC structure. The higher shear strength also facilitates reducing a need for an extra cleaning operation.

Benefits of the present disclosure include higher mechanical strengths such as shear strengths (such as by factors of 4.5 or more) of attachments of soldered structures (and chip assemblies and laser diodes) to ARC structures and sliders; reduced failure rates of slider assemblies and write and read heads; increased durability of slider assemblies (such as integrated slider assemblies) and write and read heads; reduced likelihood of de-attachment of soldered structures (and chip assemblies and laser diodes) from ARC structures; reduced failures of slider assemblies; increased yield of soldering yield to form slider assemblies for write and read heads, and reduced replacement costs (such as replacement costs for laser diodes and chip assemblies). Benefits of the present disclosure also include a reduced need for an adhesion layer between the soldered structure and the ARC structure, and a reduced need for an extra cleaning operation.

It is contemplated that one or more aspects disclosed herein may be combined. As an example, the present disclosure contemplates that aspects of the magnetic media drive 100, the head assembly 200, data storage device 300, and/or the method shown in FIGS. 4A-4I and FIGS. 5A-5C may be combined. Moreover, it is contemplated that one or more aspects disclosed herein may include some or all of the aforementioned benefits.

In one embodiment, a slider assembly for magnetic recording devices includes a slider and an anti-reflection coating (ARC) structure disposed on the slider. The ARC structure includes an outer surface facing away from the slider, and a recess extending into the outer surface to define a recessed surface. The slider assembly includes a soldered structure disposed on the recessed surface and at least partially in the recess of the ARC structure. The ARC structure includes a first layer disposed on the slider and formed of a tantalum oxide, a second layer disposed on the first layer and formed of a silicon oxide, a third layer disposed on the second layer and formed of a tantalum oxide, and a fourth layer disposed on the third layer and formed of a silicon oxide. The first layer of the ARC structure is of a first thickness that is 5 nm or less, and the second layer of the ARC structure is of a second thickness that is within a range of 250 nm to 300 nm. The third layer of the ARC structure is of a third thickness that is within a range of 50 nm to 100 nm, and the fourth layer of the ARC structure is of a fourth thickness that is within a range of 125 nm to 175 nm. The recess extends through the fourth layer of the ARC structure such that the recessed surface is a part of the third layer of the ARC structure. The soldered structure includes a first layer disposed on the fourth layer of the ARC structure. The first layer of the soldered structure is formed of titanium (Ti). The soldered structure includes a second layer disposed on the first layer of the soldered structure. The second layer of the soldered structure is formed of platinum (Pt). The soldered structure includes a third layer disposed on the second layer of the soldered structure. The third layer of the soldered structure is formed of gold (Au). The first layer of the soldered structure is of a fifth thickness that is 75 nm or less. The second layer of the soldered structure is of a sixth thickness that is 225 nm or less. The third layer of the soldered structure is of a seventh thickness that is 175 nm or less. The soldered structure includes one or more soldered layers formed of one or more gold tin (AuSn) intermetallic compounds. A magnetic recording device having the slider assembly is also disclosed.

In one embodiment, a slider assembly for data storage devices includes a sliding means and an anti-reflection coating (ARC) structure disposed on the sliding means. The ARC structure includes a first layer disposed on the sliding means and formed of a tantalum oxide, and a second layer disposed on the first layer and formed of a silicon oxide. The ARC structure includes a third layer disposed on the second layer and formed of a tantalum oxide, and a fourth layer disposed on the third layer and formed of a silicon oxide. The fourth layer includes an outer surface facing away from the slider, and a recess extending into the outer surface of the fourth layer to define a recessed surface. The slider assembly includes a soldered structure disposed on the recessed surface and at least partially in the recess of the ARC structure. The recessed surface is a part of the third layer of the ARC structure. The slider assembly includes a chip assembly. The chip assembly includes a first layer disposed on the soldered structure. The first layer of the chip assembly is formed of platinum (Pt). The chip assembly includes a second layer disposed on the first layer of the chip assembly. The second layer of the chip assembly is formed of titanium (Ti). The chip assembly includes a submount disposed on the second layer of the chip assembly, the submount formed of silicon (Si). A magnetic recording device having the slider assembly is also disclosed.

In one embodiment, a method of forming a slider assembly includes forming an anti-reflection coating (ARC) structure on a slider. The ARC structure includes an outer surface facing away from the slider. The method includes forming a recess in the ARC structure. The recess extends into the outer surface of the ARC structure to define a recessed surface. The method includes forming a solder structure on the recessed surface and at least partially in the recess of the ARC structure. The forming of the recess in the ARC structure includes etching away material of the ARC structure using an ion beam etching operation. The method includes, prior to the forming of the recess, forming one or more photoresist structures on and outwardly of the ARC structure. The etching includes selectively etching the ARC structure relative to the one or more photoresist structures. The method includes conducting a lift off operation to remove the one or more photoresist structures and solder material disposed on the one or more photoresist structures. The ion beam etching operation includes directing argon (Ar) ions toward the ARC structure. The solder structure includes a first layer disposed on the recessed surface, and the first layer is formed of titanium (Ti). The solder structure includes a second layer disposed on the first layer of the solder structure, and the second layer is formed of platinum (Pt). The solder structure includes a third layer disposed on the second layer of the solder structure, and the third layer formed of gold (Au). The solder structure includes a fourth layer disposed on the third layer of the solder structure, and the fourth layer is formed of tin (Sn). The solder structure includes a fifth layer disposed on the fourth layer of the solder structure, and the fifth layer is formed of gold (Au). The method includes forming a gold (Au) layer on the fifth layer of the solder structure, and forming a chip assembly on the gold (Au) layer. The chip assembly includes a first layer disposed on the gold (Au) layer, and the first layer of the chip assembly is formed of platinum (Pt). The chip assembly includes a second layer disposed on the first layer of the chip assembly, and the second layer of the chip assembly is formed of titanium (Ti). The chip assembly includes a submount disposed on the second layer of the chip assembly, and the submount is formed of silicon (Si). The method includes soldering the chip assembly to the solder structure. The soldering includes melting together the fourth layer of the solder structure, the fifth layer of the solder structure, and the gold (Au) layer to form a soldered structure. The soldered structure includes one or more soldered layers formed of one or more gold tin (AuSn) intermetallic compounds.

While the foregoing is directed to embodiments of the present disclosure, other and further embodiments of the disclosure may be devised without departing from the basic scope thereof, and the scope thereof is determined by the claims that follow.

What is claimed is:

1. A slider assembly for magnetic recording devices, comprising:
    a slider;
    an anti-reflection coating (ARC) structure disposed on the slider, the ARC structure comprising:
        an outer surface facing away from the slider, and
        a recess extending into the outer surface to define a recessed surface; and
    a soldered structure disposed on the recessed surface and at least partially in the recess of the ARC structure.

2. The slider assembly of claim 1, wherein the ARC structure comprises:
    a first layer disposed on the slider and formed of a tantalum oxide;
    a second layer disposed on the first layer and formed of a silicon oxide;
    a third layer disposed on the second layer and formed of a tantalum oxide; and
    a fourth layer disposed on the third layer and formed of a silicon oxide.

3. The slider assembly of claim 2, wherein:
    the first layer of the ARC structure is of a first thickness that is 5 nm or less;
    the second layer of the ARC structure is of a second thickness that is within a range of 250 nm to 300 nm;
    the third layer of the ARC structure is of a third thickness that is within a range of 50 nm to 100 nm; and
    the fourth layer of the ARC structure is of a fourth thickness that is within a range of 125 nm to 175 nm.

4. The slider assembly of claim 2, wherein the recess extends through the fourth layer of the ARC structure such that the recessed surface is a part of the third layer of the ARC structure.

5. The slider assembly of claim 2, wherein the soldered structure comprises:
    a first layer disposed on the fourth layer of the ARC structure, the first layer of the soldered structure is formed of titanium (Ti);
    a second layer disposed on the first layer of the soldered structure, the second layer of the soldered structure is formed of platinum (Pt); and
    a third layer disposed on the second layer of the soldered structure, the third layer of the soldered structure is formed of gold (Au).

6. The slider assembly of claim 5, wherein:
    the first layer of the soldered structure is of a fifth thickness that is 75 nm or less;
    the second layer of the soldered structure is of a sixth thickness that is 225 nm or less; and
    the third layer of the soldered structure is of a seventh thickness that is 175 nm or less.

7. The slider assembly of claim 5, wherein the soldered structure further comprises:
    one or more soldered layers formed of one or more gold tin (AuSn) intermetallic compounds.

8. A magnetic recording device comprising the slider assembly of claim 1.

9. A slider assembly for data storage devices, comprising:
    a slider means;
    an anti-reflection coating (ARC) structure disposed on the slider means, the ARC structure comprising:
        a first layer disposed on the slider means and formed of a tantalum oxide,
        a second layer disposed on the first layer and formed of a silicon oxide,
        a third layer disposed on the second layer and formed of a tantalum oxide, and
        a fourth layer disposed on the third layer and formed of a silicon oxide, the fourth layer comprising an outer surface facing away from the slider means, and
        a recess extending into the outer surface of the fourth layer to define a recessed surface; and
    a soldered structure disposed on the recessed surface and at least partially in the recess of the ARC structure.

10. The slider assembly of claim 9, wherein the recessed surface is a part of the third layer of the ARC structure.

11. The slider assembly of claim 9, further comprising a chip assembly, the chip assembly comprising:
    a first layer disposed on the soldered structure, the first layer of the chip assembly formed of platinum (Pt);
    a second layer disposed on the first layer of the chip assembly, the second layer of the chip assembly formed of titanium (Ti); and
    a submount disposed on the second layer of the chip assembly, the submount formed of silicon (Si).

12. A magnetic recording device comprising the slider assembly of claim 9.

13. A method of forming a slider assembly, comprising:
    forming an anti-reflection coating (ARC) structure on a slider, the ARC structure comprising an outer surface facing away from the slider;
    forming a recess in the ARC structure, the recess extending into the outer surface of the ARC structure to define a recessed surface; and
    forming a solder structure on the recessed surface and at least partially in the recess of the ARC structure.

14. The method of claim 13, wherein the forming of the recess in the ARC structure comprises: etching away material of the ARC structure using an ion beam etching operation.

15. The method of claim 14, further comprising, prior to the forming of the recess:
    forming one or more photoresist structures on and outwardly of the ARC structure, wherein the etching comprises selectively etching the ARC structure relative to the one or more photoresist structures.

16. The method of claim 15, further comprising conducting a lift off operation to remove the one or more photoresist structures and solder material disposed on the one or more photoresist structures.

17. The method of claim 14, wherein the ion beam etching operation comprises directing argon (Ar) ions toward the ARC structure.

18. The method of claim 13, wherein the solder structure comprises:
    a first layer disposed on the recessed surface, the first layer formed of titanium (Ti);

a second layer disposed on the first layer of the solder structure, the second layer formed of platinum (Pt);

a third layer disposed on the second layer of the solder structure, the third layer formed of gold (Au);

a fourth layer disposed on the third layer of the solder structure, the fourth layer formed of tin (Sn); and a fifth layer disposed on the fourth layer of the solder structure, the fifth layer formed of gold (Au).

19. The method of claim 18, further comprising:

forming a gold (Au) layer on the fifth layer of the solder structure;

forming a chip assembly on the gold (Au) layer, the chip assembly comprising:

a first layer disposed on the gold (Au) layer, the first layer of the chip assembly formed of platinum (Pt);

a second layer disposed on the first layer of the chip assembly, the second layer of the chip assembly formed of titanium (Ti); and a submount disposed on the second layer of the chip assembly, the submount formed of silicon (Si).

20. The method of claim 19, further comprising soldering the chip assembly to the solder structure, the soldering comprising:

melting together the fourth layer of the solder structure, the fifth layer of the solder structure, and the gold (Au) layer formed on the fifth layer to form a soldered structure comprising one or more soldered layers formed of one or more gold tin (AuSn) intermetallic compounds.

\* \* \* \* \*